(12) United States Patent
Bernard

(10) Patent No.: US 8,613,462 B2
(45) Date of Patent: Dec. 24, 2013

(54) COLLAPSIBLE HITCHED TRAILER

(76) Inventor: Rene Bernard, St-Lin (CA)

( * ) Notice: Subject to any disclaimer, the term of this patent is extended or adjusted under 35 U.S.C. 154(b) by 0 days.

(21) Appl. No.: 13/560,218

(22) Filed: Jul. 27, 2012

(65) Prior Publication Data

US 2013/0038038 A1  Feb. 14, 2013

(30) Foreign Application Priority Data

Aug. 11, 2011 (GB) .................................. 1113855.9

(51) Int. Cl.
*B60D 1/54* (2006.01)

(52) U.S. Cl.
USPC ..... 280/415.1; 280/656; 280/639; 280/491.2; 280/491.4

(58) Field of Classification Search
USPC ................. 280/415.1, 656, 639, 491.2, 491.4
See application file for complete search history.

(56) References Cited

U.S. PATENT DOCUMENTS

| | | | |
|---|---|---|---|
| 611,675 A | 10/1898 | Brookmeyer | |
| 2,790,673 A | 4/1957 | Zur Nieden | |
| 2,898,144 A | 8/1959 | Ferrera | |
| 3,403,924 A | 10/1968 | Oilveira | |
| 4,057,282 A | 11/1977 | Kidd | |
| 4,126,324 A * | 11/1978 | Browning | 280/42 |
| 4,239,258 A | 12/1980 | Burris | |
| 4,350,222 A | 9/1982 | Lutteke et al. | |
| 4,671,530 A * | 6/1987 | van der Wouden | 280/656 |
| 4,768,806 A | 9/1988 | Tétreault | |
| 5,326,128 A | 7/1994 | Cromley, Jr. | |
| 5,464,243 A | 11/1995 | Maiwald et al. | |
| 6,428,035 B1 * | 8/2002 | Maxwell et al. | 280/656 |
| 6,846,003 B2 | 1/2005 | Thompson | |
| 2007/0252357 A1 * | 11/2007 | Hoskins | 280/415.1 |
| 2009/0134605 A1 | 5/2009 | Norton | |
| 2011/0204601 A1 * | 8/2011 | Alvarino | 280/656 |
| 2011/0221168 A1 * | 9/2011 | Alexander | 280/639 |
| 2012/0292890 A1 * | 11/2012 | Lomas et al. | 280/656 |

FOREIGN PATENT DOCUMENTS

| | | |
|---|---|---|
| CA | 2154918 | 9/1998 |
| EP | 2208662 | 7/2010 |
| ES | 2155302 | 5/2001 |
| WO | WO2006045155 | 4/2006 |

* cited by examiner

*Primary Examiner* — Tashiana Adams
*Assistant Examiner* — Marlon Arce

(57) ABSTRACT

A collapsible hitched trailer comprised of a bed member having a center bed section, and two pivotable bed sections pivotally attached to opposite sides of the center bed section. A protracting wheel axle member attached to an underside of the center bed section. Two wheels, one attached to each opposite end of the wheel axle member, and a draw bar member attached to one of the two pivotable bed sections, wherein the hitched trailer can be folded into a smaller shape and stored in a smaller area.

3 Claims, 6 Drawing Sheets

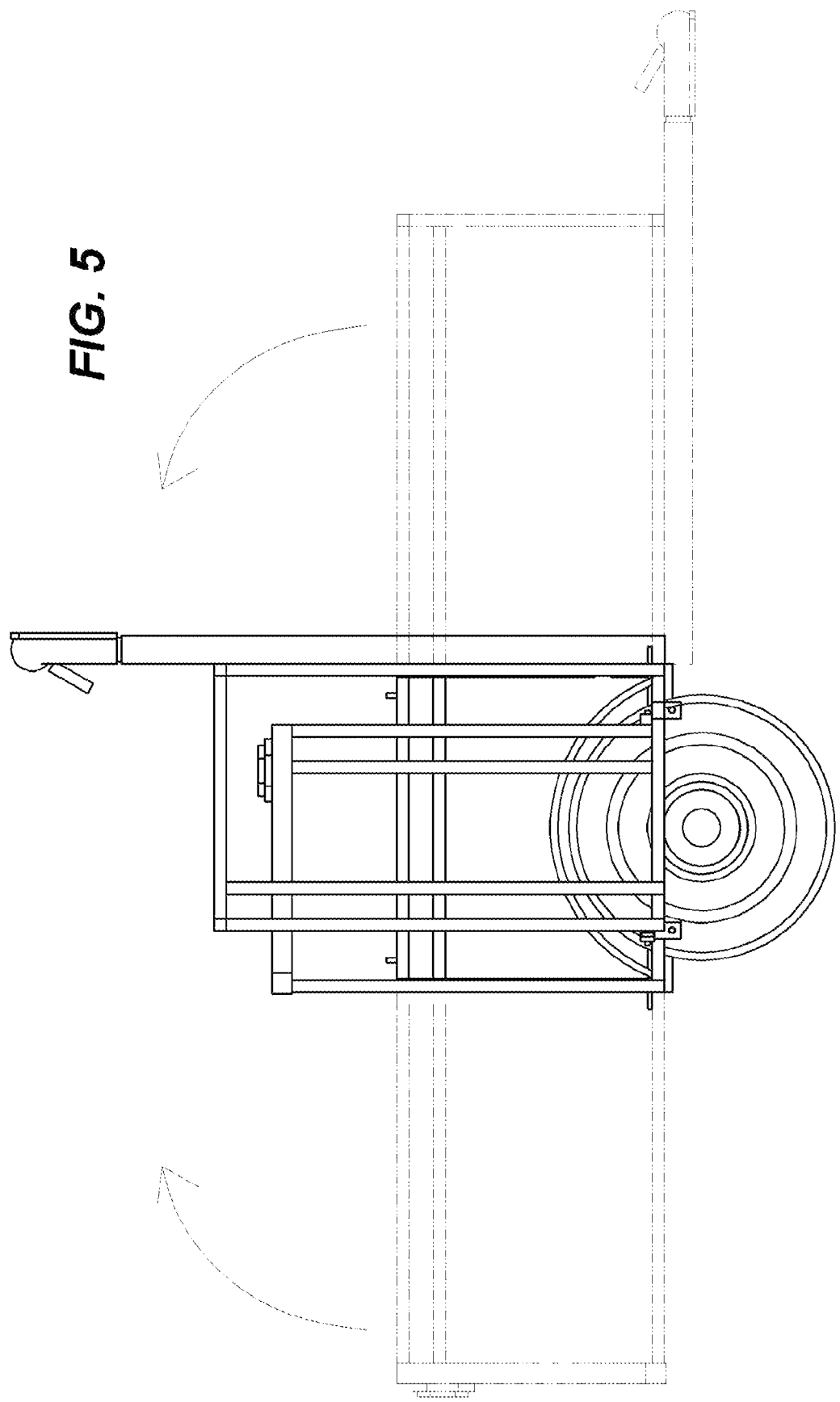

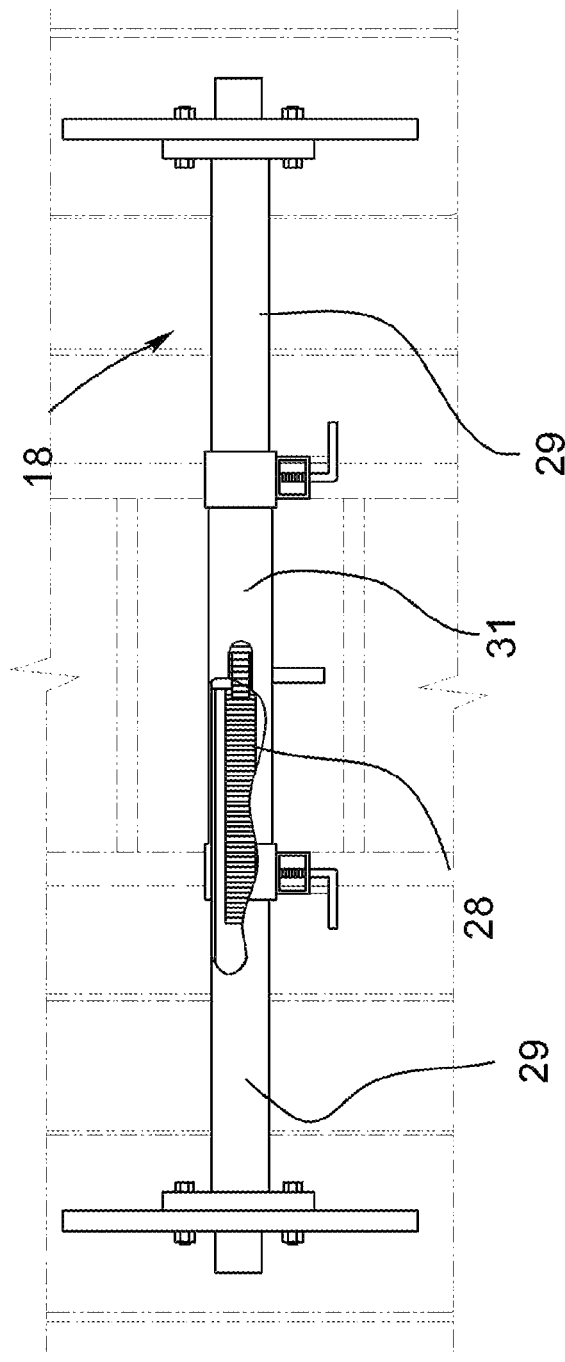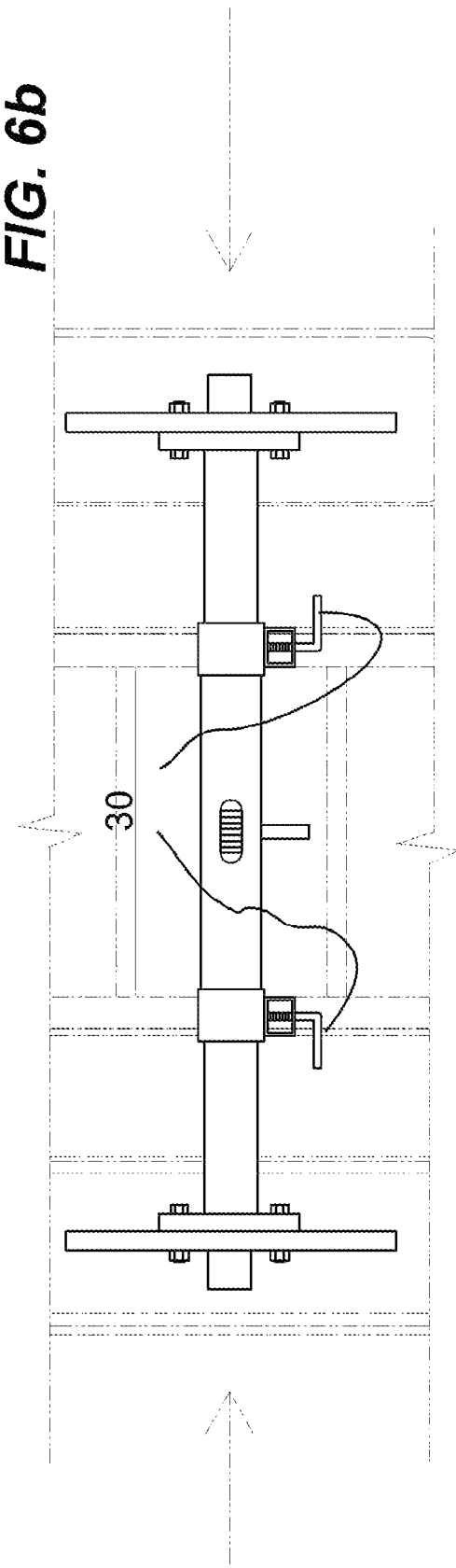

COLLAPSIBLE HITCHED TRAILER

This application claims priority based on request GB1113855.9 filed Aug. 11, 2011

FIELD OF THE INVENTION

The present invention relates generally to hitched trailers but more particularly to a collapsible hitched trailer.

BACKGROUND OF THE INVENTION

There are many types of hitched trailers and one problem is that when we don't need them, they take up a lot of space. To solve this problem, some types of trailers can be dismantled or folded, or any combination thereof to make them less obtrusive when not in use.

SUMMARY OF THE INVENTION

In view of the foregoing disadvantages inherent in the known devices now present in the prior art, the present invention, which will be described subsequently in greater detail, is to provide objects and advantages which are:

To provide for a trailer that can have its wheelbase narrower and its bed folded so as to become more compact. The draw bar can also be retracted to make it even more compact.

In order to do so, the invention consists in a collapsible hitched trailer comprised of a bed member having a center bed section, and two pivotable bed sections pivotally attached to opposite sides of the center bed section. A protracting wheel axle member attached to an underside of the center bed section. Two wheels, one attached to each opposite end of the wheel axle member, and a draw bar member attached to one of the two pivotable bed sections, wherein the hitched trailer can be folded into a smaller shape and stored in a smaller area.

The collapsible hitched trailer has its protracting wheel axle member further including a mid-section side panel member extending perpendicularly upwards with respect to the wheel axle member, and wherein each of the two pivotable bed sections further include side panels each extending perpendicularly upwards with respect to the wheel axle member and each being adapted to be releasably connected to an adjacent mid-section side panel member, such that when the trailer is to be collapsed, the side panels are detached from respective adjacent mid-section side panel members, the wheel axle member is retracted thereby moving the wheels, wheelbases, and mid-section side panel members inwardly, and the two pivotable bed sections are pivoted to a vertical position with respect to the wheel axle member, and when the trailer is needed, the two pivotable bed sections are pivoted to a parallel position with respect to the wheel axle member, the wheel axle member is protracted thereby moving the wheels, wheelbases, and mid-section side panel members outwardly, and the side panels are attached to respective adjacent mid-section members.

Each of the two pivotable bed sections further include a back panel each extending perpendicularly upwards with respect to the wheel axle member and are attached to respective end portions of adjacent side panels.

The protracting wheel axle member comprises a hollow central sleeve member that is attached to the underside of the center bed section. Two lateral sleeve members inserted into opposite ends of the hollow central sleeve member and each adapted to move linearly in and out of the hollow central sleeve member in the direction of the central axis of the hollow central sleeve member. Two pin members each adapted to lock a respective lateral sleeve member in a desired position, and two pipe members inserted within and extending along the length of the central sleeve member and the lateral sleeve members, one attached to each respective wheel member, and each formed as having a half-circle cross-section, such that when installed within the sleeve members and attached to the wheel members they together form a full-circle and effectively lock each other into place such that they rotate together and turn the wheels at the same time and rate.

The collapsible hitched trailer has each of the mid-section side panel members include two locking members located on opposite sides of a top lateral portion thereof and are adapted to releasably connect with respective adjacent side portions of each of the two pivotable bed sections, such that when the trailer is an a lowered unfolded position the mid-section side panel members releasably lock together with the pivotable bed sections and form rigid continuous side rails, and when it is desired to fold and store the trailer, the mid-section side panel members are unlocked from the pivotable bed sections so pivoting and folding can occur.

The pivoting connections between the two pivotable bed sections and the center bed section are formed by mechanical hinges.

The draw bar member comprises two telescoping portions. A first telescoping portion rigidly connected to one of the two pivotable bed sections, and a second telescoping portion adjustably slidably within and releasably connected to the first telescoping portion, such that when in a folded configuration the draw bar can be reduced in length for storage.

The draw bar member further comprises a hitch ball socket at a distal end of the second telescoping portion adapted to releasably engage with a ball portion of a latch member attached to a towing vehicle.

One of the two pivotable bed sections is larger than the other such that when in a collapsed configuration the smaller section is adapted to fit within the side rails of the larger section in order to result in a smaller folded shape.

The hollow central sleeve member and the two lateral sleeve members of the protracting wheel axle are formed as having square cross sections to thereby avoid rotational movements between parts.

Each of the mid-section side panel members further include a stopper member adapted to facilitate proper alignment between each of the mid-section side panel and the respective adjacent side panels of each of the pivotable bed section when in an open position.

Each of the side panel member further includes a stopper catch member adapted to fit around a respective stopper member of an adjacent mid-section side panel in order to facilitate proper alignment between each of the mid-section side panel and the respective adjacent side panels of each of the pivotable bed section when in an open position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

BRIEF DESCRIPTION OF THE DRAWINGS

FIG. 5 Side view of the invention folded.
FIGS. 6a-b Front views of the wheel axle member protracted and retracted.

DETAILED DESCRIPTION OF THE PREFERRED EMBODIMENT

Figure 1:
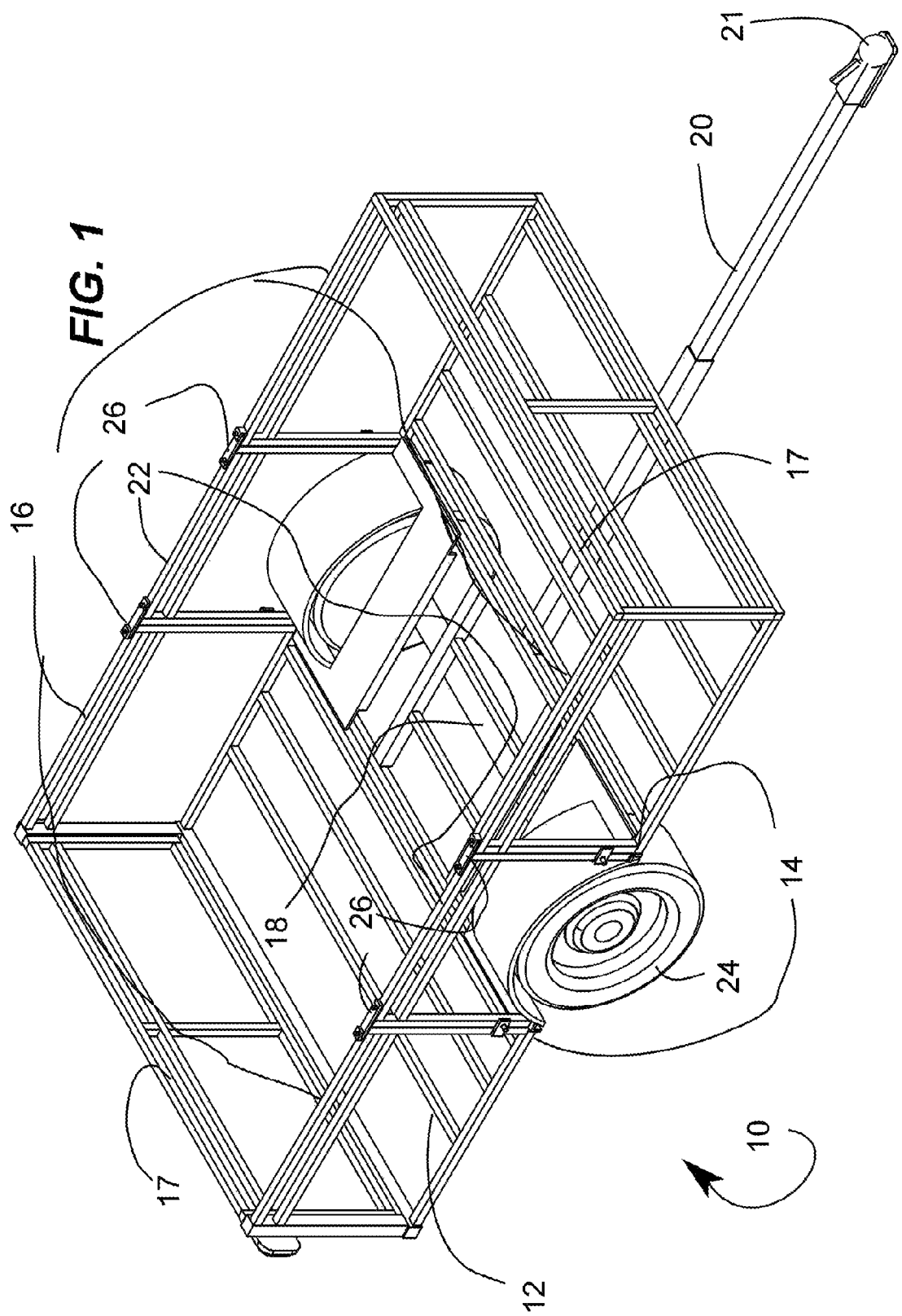
FIG. 1 Isometric view of the invention in use.
Figure 2:
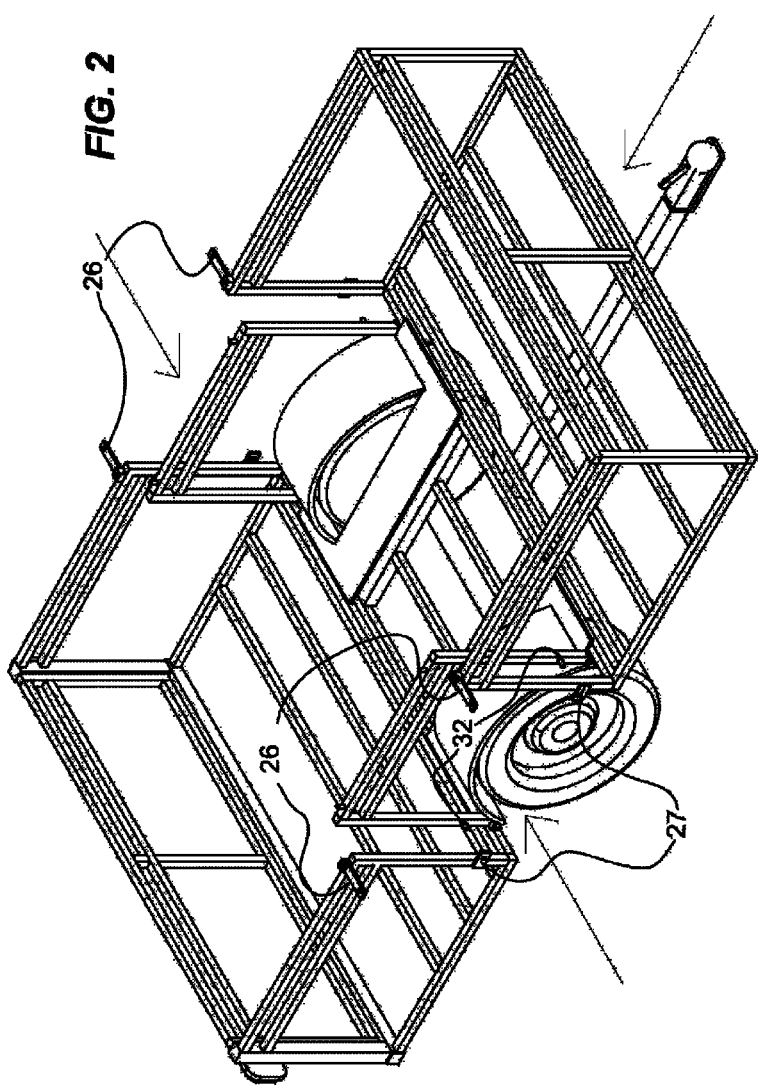
FIG. 2 Isometric view of the invention with the wheel base narrowed.

A collapsible hitched trailer (10) has a bed member (!2) having a center bed section (13), and two pivotable bed sections (15) pivotally attached to opposite sides of the center bed section (13) with hinges (14). Side panels (16) and back panels (17) extend perpendicularly from the bed member (12). A protracting wheel axle member (18) is attached underneath the bed member (12) and a retractable draw bar (20) extends from the front of the bed (12).

Figure 3:
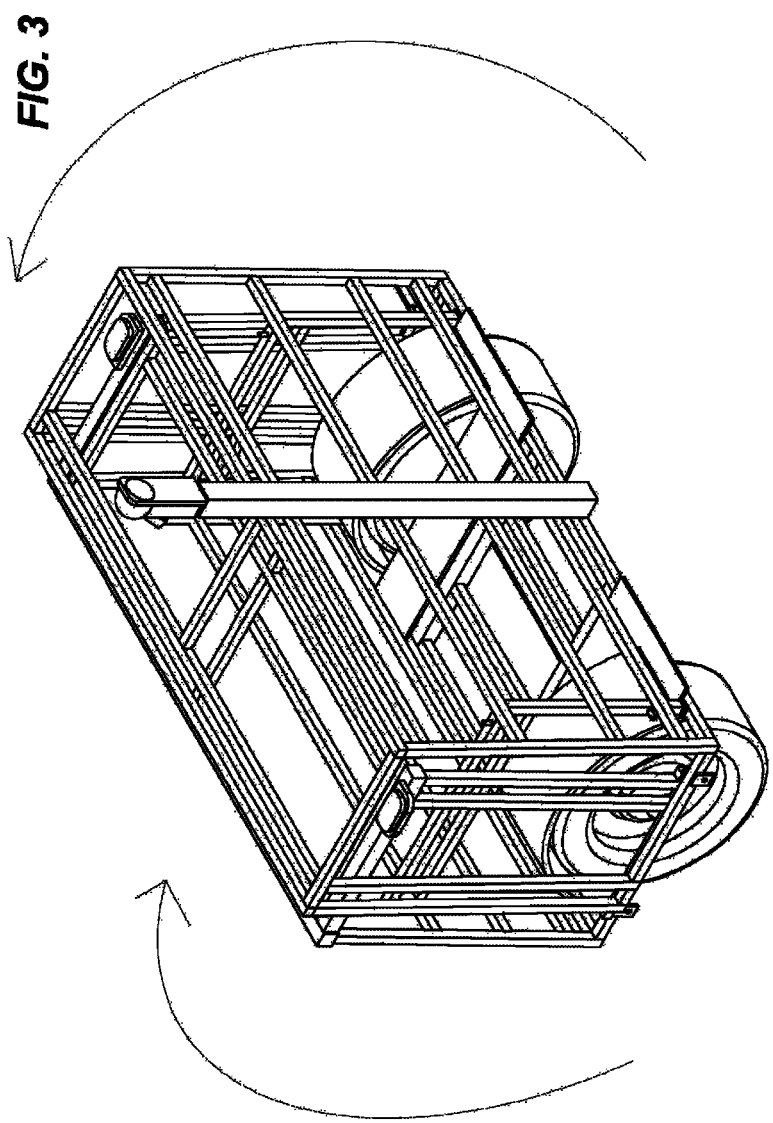
FIG. 3 Isometric view of the invention folded.
Figure 4A:
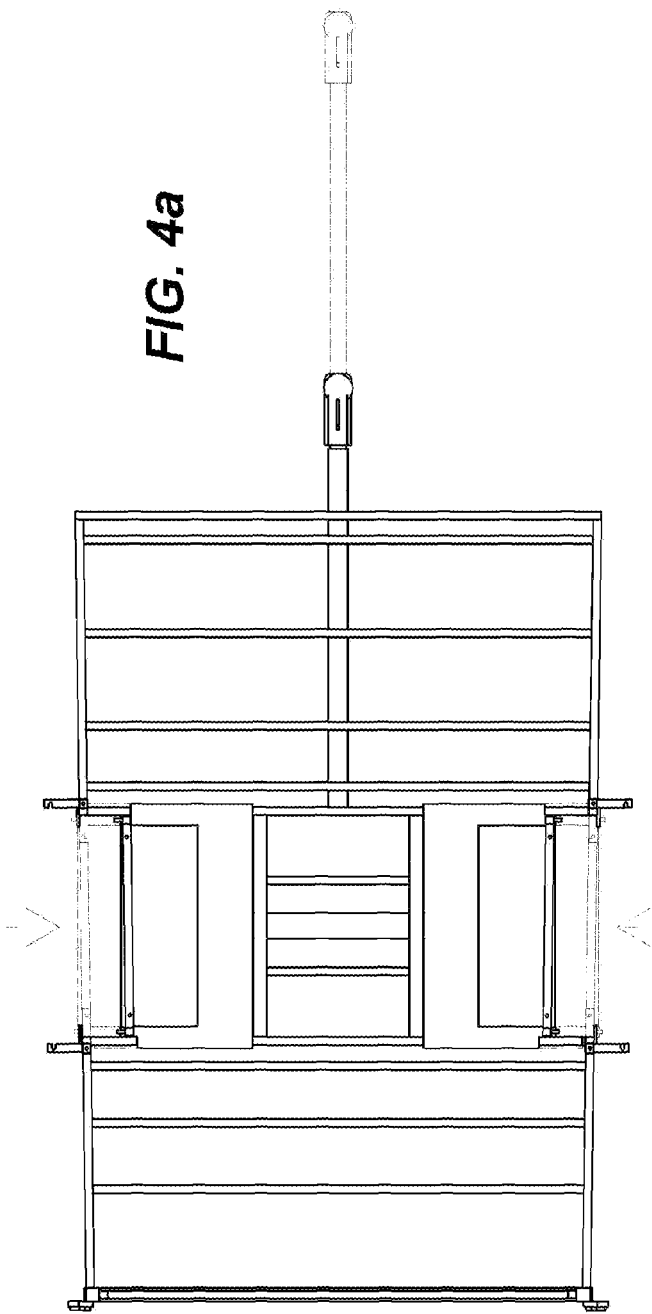
FIGS. 4a-b Top and side views of the invention.
Figure 4B:
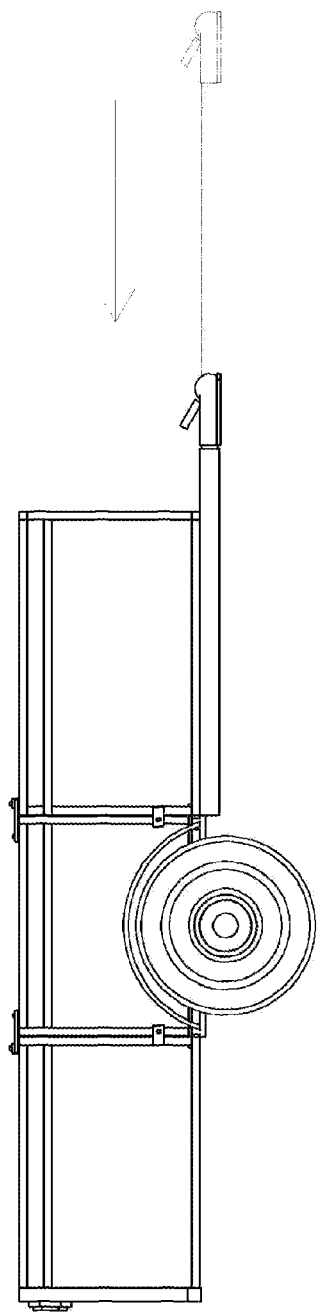

As the wheel axle member (18) is protracted manually, it takes with it the a pair of side panel mid sections (22) located on each side, this creates a void that allows for the two pivotable bed sections (15) to fold and close clamshell style over to the side of the wheels (24) as shown in FIG. 3.

Doing the reverse operation swill unfold the pivotable bed sections (15), retract the side panel mid sections (22), and retract the wheel axle member (18).

When the trailer (10) is in use i.e. to carry a load, the side panel mid sections (22) are locked in place by locking means (26). There are also stopper members (27) and stopper catch members (32) to line up the side panel mid sections (22) with the two pivotable bed sections (15)

In order to retract or protract, the wheel axle member (18), a pair of pipes (28), located inside lateral sleeves (29) and central sleeve (31), have their respective overlapping parts in the shape of a half circle so that together they form a full circle and lock each others in such a way that both wheels (24) turn together as the pipes (28) rotate inside the sleeves (29, 31). A set of pins (30) lock the sleeves (29, 31) in either their protracted or retracted configurations. The central sleeve (31) has a larger diameter than the lateral sleeves (29) so that the latter can ingress inside the central sleeve (31).

The draw bar (20) is made out of two telescoping sections and is configured like typical draw bars, meaning that it has a hitch ball socket (21) at its distal end. Being telescopic, the draw bar (20) and can further reduce the size of the trailer (10) when not in use.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, the pipes (28) can be square instead of half circles in order to accomplish the same function.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A collapsible hitched trailer comprising of a bed member having a center bed section, and two pivotable bed sections pivotally attached to opposite sides of said center bed section; a protracting-wheel axle member attached to an underside of said center bed section; two wheels, one attached to each opposite end of said axle member; and a draw bar member attached to one of said two pivotable bed sections, wherein said hitched trailer can be folded into a smaller shape and stored in a smaller area;

a mid-section side panel member extending perpendicularly upwards with respect to said wheel axle member; and wherein each of said two pivotable bed sections further include side panels each extending perpendicularly upwards with respect to said wheel axle member and are each adapted to be releasably connected to an adjacent mid-section side panel member, such that when the trailer is to be collapsed, said side panels are detached from respective adjacent mid-section side panel members, said wheel axle member is retracted thereby moving said wheels, and mid-section side panel members inwardly, and said two pivotable bed sections are pivoted to a vertical position with respect to said wheel axle member, and when said trailer is needed, said two pivotable bed sections are pivoted to a parallel position with respect to said wheel axle member, said wheel axle member is protracted thereby moving said wheels, and mid-section side panel members outwardly, and said side panels are attached to respective adjacent mid-section members;

each of said two pivotable bed sections further include a back panel each extending perpendicularly upwards with respect to said wheel axle member and are attached to respective end portions of adjacent side panels;

said protracting wheel axle member comprises a hollow central sleeve member that is attached to said underside of said center bed section; two lateral sleeve members inserted into opposite ends of said hollow central sleeve member and each adapted to move linearly in and out of said hollow central sleeve member in the direction of the central axis of said hollow central sleeve member; two pin members each adapted to lock a respective lateral sleeve member in a desired position; and two pipe members inserted within and extending along the length of said central sleeve member and said lateral sleeve members, one attached to each respective wheel member, and each formed as having a half-circle cross-section, such that when installed within said sleeve members and attached to said wheel members they together form a full-circle and effectively lock each other into place such that they rotate together and turn said wheels at the same time and rate.

2. The collapsible hitched trailer of claim 1, wherein one of said two pivotable bed sections is larger than the other such that when in a collapsed configuration the smaller section is adapted to fit within the side rails of the larger section in order to result in a smaller folded shape.

3. The collapsible hitched trailer of claim 1, wherein said hollow central sleeve member and said two lateral sleeve members of said protracting wheel axle are formed as having square cross sections to thereby avoid rotational movements between parts.

\* \* \* \* \*